(12) United States Patent  
Wang

(10) Patent No.: US 8,817,073 B2  
(45) Date of Patent: Aug. 26, 2014

(54) SYSTEM AND METHOD OF PROCESSING 3D STEREOSCOPIC IMAGE

(75) Inventor: Tzung-Ren Wang, Tainan (TW)

(73) Assignee: Himax Technologies Limited, Tainan (TW)

( * ) Notice: Subject to any disclaimer, the term of this patent is extended or adjusted under 35 U.S.C. 154(b) by 469 days.

(21) Appl. No.: 13/208,977

(22) Filed: Aug. 12, 2011

(65) Prior Publication Data

US 2013/0038600 A1 Feb. 14, 2013

(51) Int. Cl.
*H04N 13/00* (2006.01)
*H04N 15/00* (2006.01)
*G06T 15/00* (2011.01)
*H04N 7/32* (2006.01)

(52) U.S. Cl.
CPC ..... *H04N 13/0055* (2013.01); *H04N 19/00769* (2013.01)
USPC ............................................. 348/43; 345/419

(58) Field of Classification Search
CPC ................................................. H04N 13/0055
USPC .................................................... 348/43–161
See application file for complete search history.

(56) References Cited

U.S. PATENT DOCUMENTS

| | | | | |
|---|---|---|---|---|
| 7,224,355 B2* | 5/2007 | Auberger et al. | ............. | 345/419 |
| 7,359,547 B2* | 4/2008 | Noto et al. | ..................... | 382/152 |
| 8,411,931 B2* | 4/2013 | Zhou et al. | .................... | 382/154 |
| 8,532,425 B2* | 9/2013 | Ali et al. | ........................ | 382/260 |
| 8,610,758 B2* | 12/2013 | Cheng et al. | .................... | 348/46 |
| 2004/0057613 A1* | 3/2004 | Noto et al. | ..................... | 382/154 |
| 2006/0082575 A1* | 4/2006 | Auberger et al. | ............. | 345/421 |
| 2007/0018977 A1* | 1/2007 | Niem et al. | ..................... | 345/422 |
| 2009/0116732 A1* | 5/2009 | Zhou et al. | ..................... | 382/154 |
| 2010/0194741 A1* | 8/2010 | Finocchio | ..................... | 345/419 |
| 2011/0261050 A1* | 10/2011 | Smolic et al. | ................. | 345/419 |
| 2011/0273529 A1* | 11/2011 | Lai et al. | ......................... | 348/42 |
| 2012/0026295 A1* | 2/2012 | Nishimura et al. | ............. | 348/46 |
| 2012/0195492 A1* | 8/2012 | Ali et al. | ........................ | 382/154 |
| 2013/0169749 A1* | 7/2013 | Zhou et al. | ..................... | 348/43 |

* cited by examiner

*Primary Examiner* — Joseph Ustaris
*Assistant Examiner* — Talha Nawaz
(74) *Attorney, Agent, or Firm* — David I. Roche; Baker & McKenzie LLP

(57) ABSTRACT

A 3D stereoscopic image processing system comprises a receiver unit and an image processing unit. The receiver unit is adapted to receive a pair of stereoscopic images. The image processing unit is adapted to compute a first depth map from the pair of stereoscopic images, determine extreme depth values from a window selected in the depth map, determine a filter map based on the extreme depth values, and compute a second depth map by combining the filter map with the first depth map. In other embodiments, a method of processing stereoscopic images is provided, comprising computing a first depth map from a pair of stereoscopic images, generating a filter map associated with the first depth map, and combining the first depth map with the filter map to derive a second depth map.

14 Claims, 6 Drawing Sheets

SYSTEM AND METHOD OF PROCESSING 3D STEREOSCOPIC IMAGE

BACKGROUND

1. Field of the Invention

The invention relates to image processing systems, and more particularly, to three-dimensional stereoscopic image processing systems.

2. Description of the Related Art

For increased realism, three-dimensional (3D) stereoscopic image technology is increasingly applied in various fields such as broadcasting, gaming, animation, virtual reality, etc. The stereoscopic vision perceived by a human being is mainly caused by the binocular disparity created by the lateral distance between the left eye and right eye. Due to binocular disparity, the left eye and the right eye can receive an image of a same scene under two different perspective views. The brain then can combine these two images to create the depth sense of the 3D stereoscopic vision.

To create a stereoscopic perception in image rendering, two sets of images are typically captured or generated to simulate the left eye view and right eye view. When these two images are displayed on a two-dimensional screen, a specific viewing apparatus (e.g., viewing glasses) can be used to separate the two images, so that each of the left and right eyes can only see the image associated therewith. The brain can then recombine these two different images to produce the depth perception.

For realistic rendering of stereoscopic images, two cameras may be used to capture two images under slightly different angles. A stereo matching technique is then applied to find the disparity between the two images, and construct depth values associated with the pixels of the images. The depth values can typically represent distance information between points in the scene and the viewpoint of the cameras, and can be used with the left-view and right-view images to synthesize 3D stereoscopic images. Depending on the computing algorithm implemented, imprecision or inaccurate data may be introduced in the disparity and depth maps where are stored the disparity and depth values. For example, it may be a challenge to estimate the suitable disparity and depth values for occlusion regions that occur when a feature is visible from one image, and find no match in the other image of the stereoscopic pair. While certain more complex algorithms have been proposed to resolve the occlusion issues, they usually result in an increase of the computation cost.

Therefore, there is a need for a system that can process stereoscopic images in a more efficient way, and address at least the foregoing issues.

SUMMARY

The present application describes a system and method of processing stereoscopic images. In one embodiment, the system comprises a receiver unit and an image processing unit. The receiver unit is adapted to receive a pair of stereoscopic images. The image processing unit is adapted to compute a first depth map from the pair of stereoscopic images, determine extreme depth values from a window selected in the depth map, determine a filter map based on the extreme depth values, and compute a second depth map by combining the filter map with the first depth map.

In other embodiments, the present application describes a method of processing stereoscopic images. The method can comprise computing a first depth map from a pair of stereoscopic images, generating a filter map associated with the first depth map, and combining the first depth map with the filter map to derive a second depth map.

At least one advantage of the stereoscopic image processing system described herein is the ability to correct abnormal depth data and occlusion holes in the depth map in a cost-effective manner.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION

Figure 1:
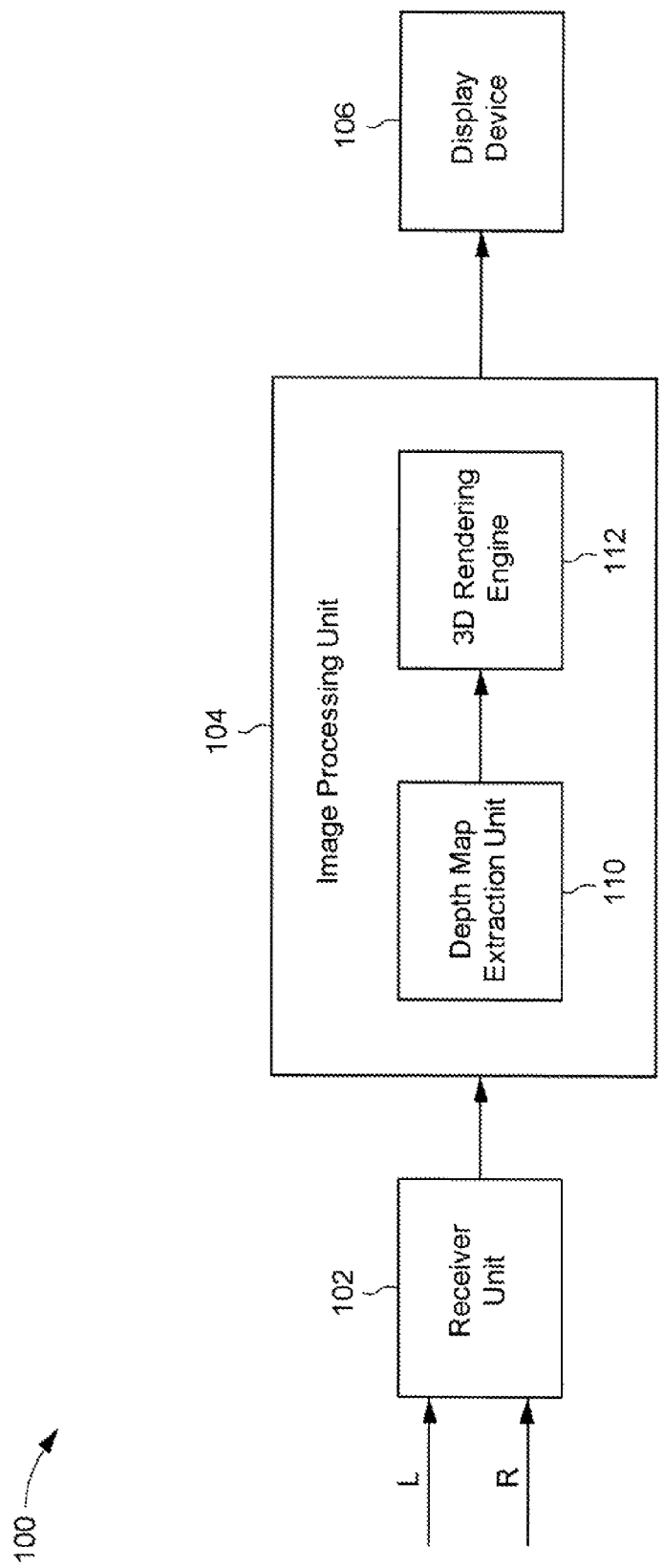
FIG. 1 is a simplified diagram illustrating one embodiment of a stereoscopic image processing system.

FIG. 1 is a simplified diagram illustrating one embodiment of a 3D stereoscopic image processing system 100. The system 100 can include a receiver unit 102, an image processing unit 104 and a display device 106. The receiver unit 102 can receive image data as inputs, convert the image data to adequate formats, and then transmit the image data to the image processing unit 104. For example, the image data inputted to the receiver unit 102 can include a left-view image L and a right-view image R that are two-dimensional images representing two different perspectives (i.e., left-eye and right-eye perspectives) of a same scene taken from two cameras. The receiver unit 102 can adjust the left-view image L and the right-view image R to a proper format, and then send the stereoscopic pair of the left-view image L and right-view image R to the image processing unit 104.

The image processing unit 104 can include a depth map extraction unit 110 adapted to compute a depth map ZMAP associated with the left-view image L and right-view image R, and a 3D rendering engine 112 adapted to process the left-view image L and right-view image R with the depth map ZMAP to generate 3D stereoscopic image frames to be shown on the display device 106.

Figure 2:
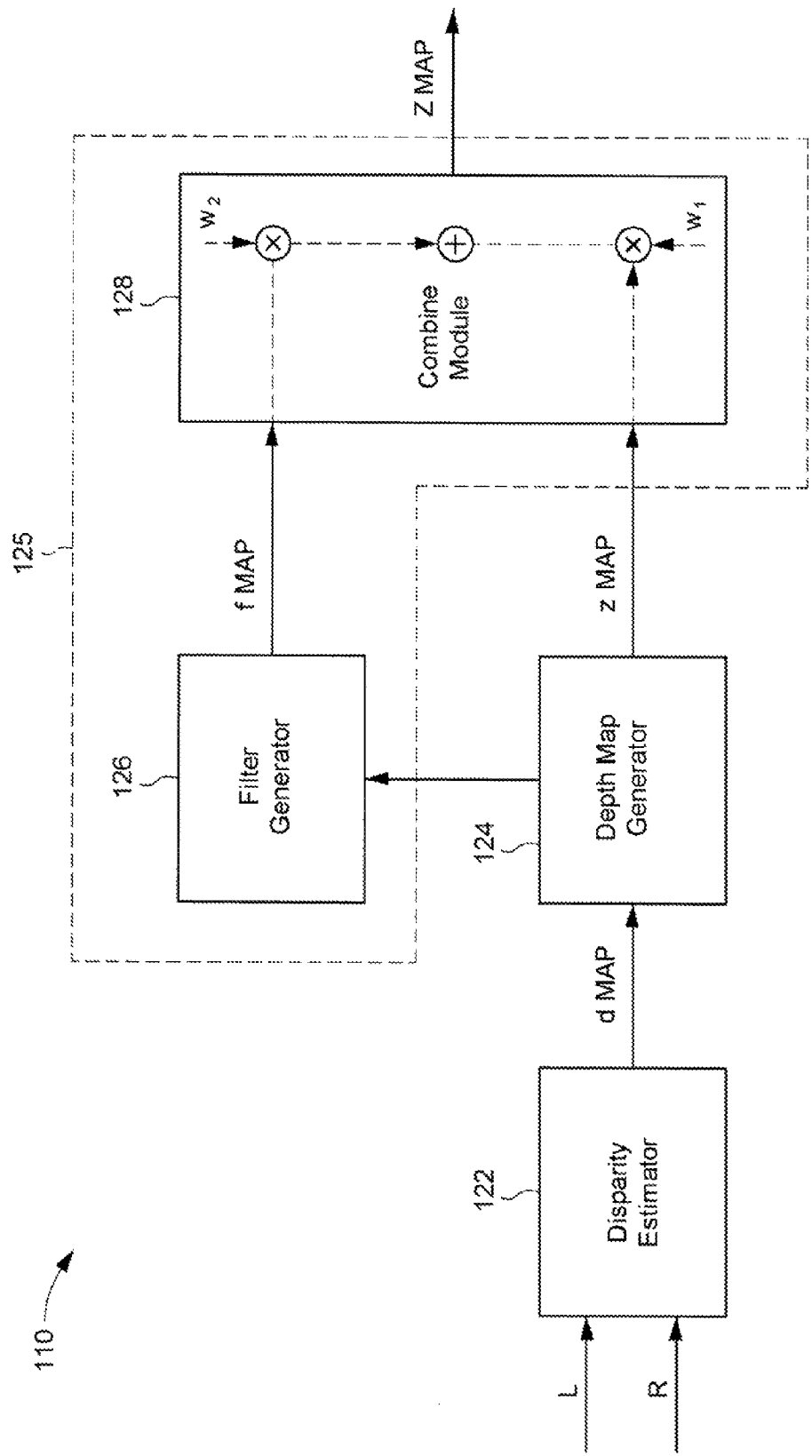
FIG. 2 is a diagram illustrating one embodiment of a depth map extraction unit implemented in the stereoscopic image processing system.

FIG. 2 is a diagram illustrating one embodiment of the depth map extraction unit 110. The depth map extraction unit 110 can include a disparity estimator 122, a depth map generator 124, and a depth map filter unit 125 including a filter generator 126 and a combine module 128. The disparity estimator 122 can compute a disparity value for each pixel in the left-view image L/right-view image R by evaluating an amount of displacement between corresponding pixels or groups of pixels in the left-view image L and the right-view image R, and generate a corresponding disparity map dMAP for the left-view image L and the right-view image R that includes all the disparity values d.

Based on the disparity values in the disparity map dMAP, the depth map generator 124 can derive a depth map zMAP that includes depth values z associated with pixels or groups of pixels in the left-view image L/right-view image R. A depth value z (distance between a scene point and a camera) can be derived as being inversely proportional to a disparity value d according to the formulae:

$$z = C/d, \quad (1)$$

wherein C is a constant parameter function of the distance between the two cameras and the focal length of the cameras.

The depth filter unit 125 can receive certain parameters from the depth generator 124, and construct a filter map fMAP via the filter generator 126. The filter map fMAP includes depth values that can be defined according to a filter function predetermined according to certain characteristics of the depth map zMAP provided by the depth map generator 124. These depth values of the filter map fMAP can be used to correct abnormal values that may occur in the depth map zMAP, such as incorrect boundary depth values.

The combine module 128 can receive the depth map zMAP outputted from the depth map generator 124 and the filter map fMAP outputted from the filter generator 126, and combine the depth map zMAP with the filter map fMAP to derive the corrected depth map ZMAP.

Figure 3:
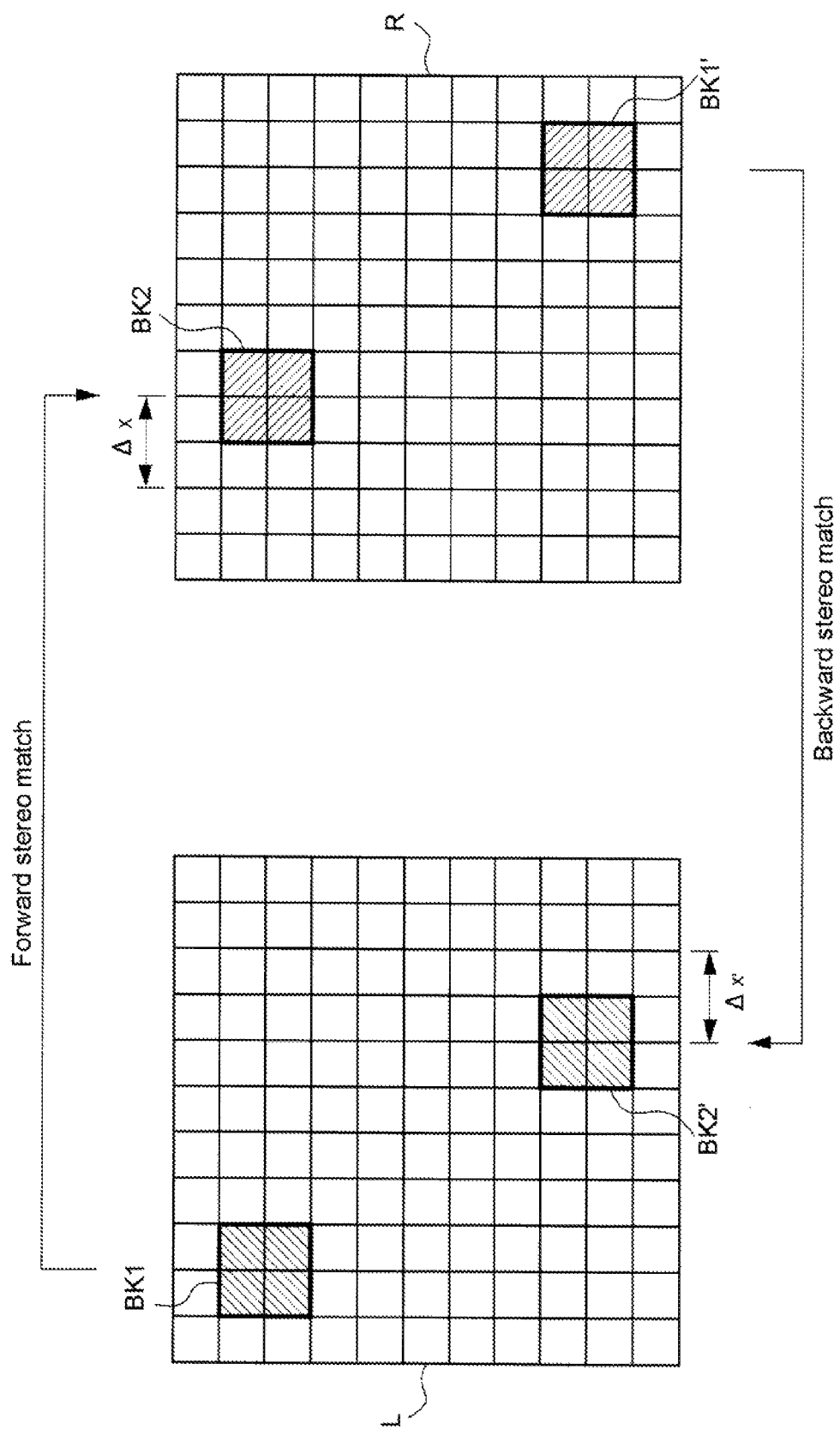
FIG. 3 is a schematic diagram illustrating a method of estimating disparity values for generating a disparity map.

FIG. 3 is a schematic diagram illustrating a method of estimating disparity values for generating the disparity map dMAP. To determine disparity data from the left-view image L and right-view image R, a bidirectional stereo matching approach can be applied to measure the amount of displacement between corresponding pixels or groups of pixels in the left-view image L and the right-view image R. The bidirectional stereo matching approach can include forward and backward matching procedures. In the forward matching procedure, the pixel values in a block of pixels BK1 in the left-view image L taken as reference can be compared to the pixel values in a block of pixels BK2 in the right-view image R that is shifted to the right hand from the position of the block of pixels BK1 by an amount of displacement $\Delta x$. In one embodiment, a match can be determined by applying an aggregate of differences between the pixel values of the pixels in the matching blocks of pixels BK1 and BK2, e.g., with the conventional sum of absolute difference (SAD) method. In this manner, a disparity value can be estimated for each pixel or block of pixels in the left-view image L. These disparity values can be recorded as grayscale values in the disparity map.

In the backward matching procedure, the pixel values in a block of pixels BK1' in the right-view image R taken as reference can be compared to the pixel values in a block of pixels BK2' in the left-view image L that is shifted to the left hand from the position of the block of pixels BK1' by an amount of displacement $\Delta x'$. When a match occurs, a disparity value can be thereby derived for the pixel or block of pixels in the right-view image R. With the bidirectional stereo matching method, two disparity maps can be provided to accurately detect the occurrence of boundaries and occlusions corresponding to "holes" in the disparity map.

Figure 4:
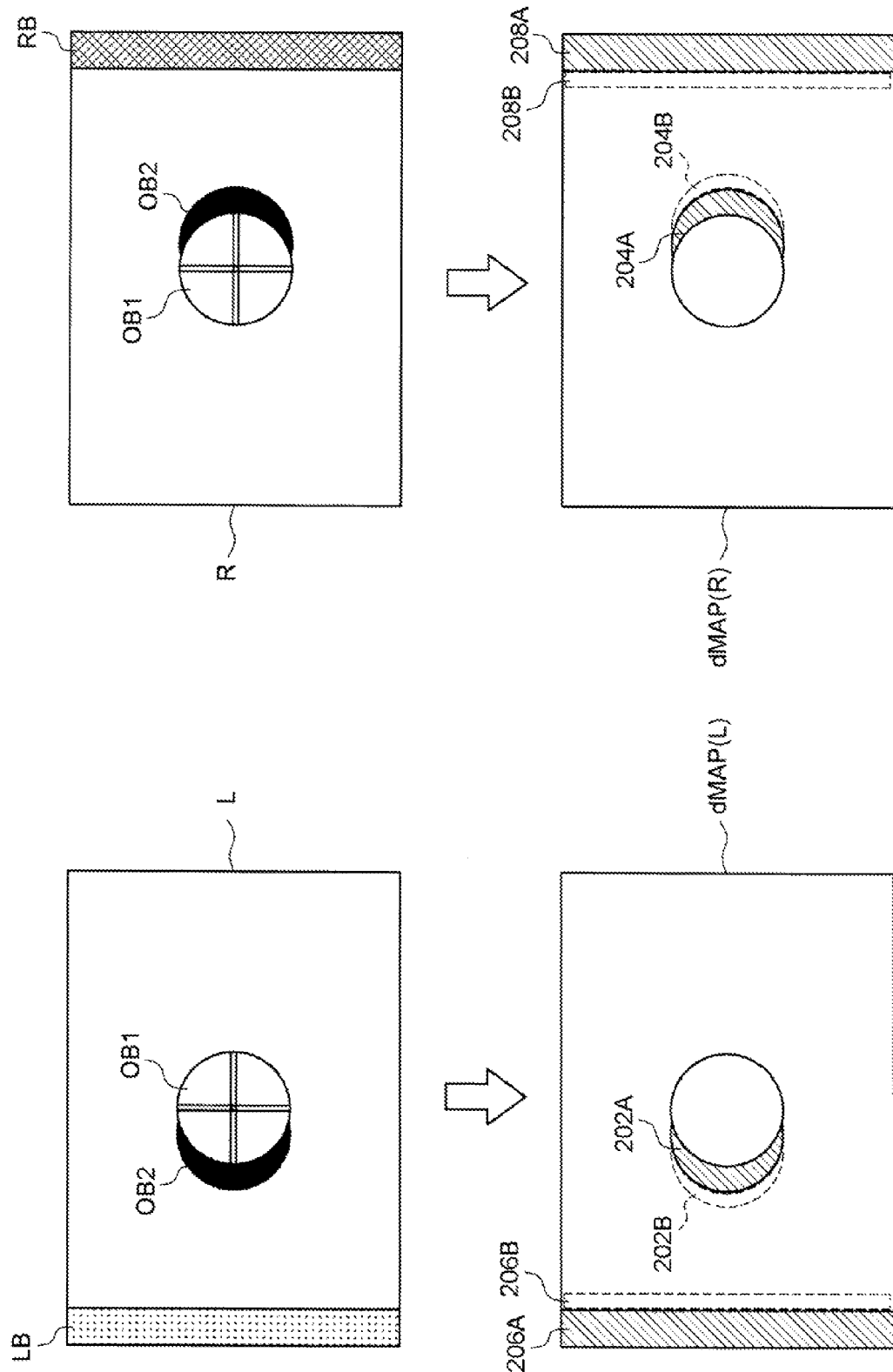
FIG. 4 is a schematic diagram illustrating one embodiment of handling boundaries and occlusion holes in the disparity map.

FIG. 4 is a schematic diagram illustrating one embodiment of handling boundary and occlusion holes. The occurrence of an occlusion typically means that a feature OB1 (e.g., a cover) is occluding at least a part of another feature OB2 (e.g., an opening) in the captured scene, such that a portion of the feature OB2 in the left-view image L (or right-view image R) cannot find any match in the right-view image R (or left-view image L) when stereo matching is applied. As a result, corresponding occlusion holes 202A and 204A can appear in the disparity maps dMAP(L) and dMAP(R) (and depth maps) respectively associated with the left-view image L and right-view image R (the disparity map dMAP(L) can be constructed by applying a forward stereo matching procedure, whereas the disparity map dMAP(R) can be constructed by applying a backward stereo matching procedure). Side edge boundary regions (e.g., left edge boundary region LB in the left-view image L, and right edge boundary region RB in the right-view image R) can also be regions where no match is found, creating corresponding holes 206A and 208A in the disparity maps dMAP(L) and dMAP(R).

In one embodiment, the holes in the disparity maps may be filled with disparity data of adjacent pixels. For example, as shown in FIG. 4, the occlusion hole 202A in the disparity map dMAP(L) can be filled with the disparity values of the pixel region 202B adjacent to the left side of the occlusion hole 202A, which may correspond to a pixel region adjacent to the left side of the portion of the feature OB2 visible in the left-view map L.

In the disparity map dMAP(R), the occlusion hole 204A can be likewise filled with the disparity values of the pixel region 204B adjacent to the right side of the occlusion hole 204A, which may correspond to a pixel region adjacent to the right side of the portion of the feature OB2 visible in the right-view map R.

In the same manner, the left-side boundary hole 206A in the disparity map dMAP(L) can be filled with the disparity values of the pixel region 206B that is adjacent to the right side of the left-side boundary hole 206A. The right-side boundary hole 208A in the disparity map dMAP(R) can be filled with the disparity values of the pixel region 208B that is adjacent to the left side of the right-side boundary hole 208A. Should there be a right-side boundary hole in the left disparity map dMAP(L) and a left-side boundary hole in the right disparity map dMAP(R), disparity values of adjacent pixel regions (e.g., the left-side pixel region for the right-side boundary hole in the disparity map dMAP(L), and the right-side pixel region for the left-side boundary hole in the disparity map dMAP(R)) can be likewise used to fill these boundary holes.

Using the disparity values of adjacent pixel regions to fill the holes corresponding to occlusions and side boundaries may save computing cost and time. However, in alternate embodiments, other methods (e.g., interpolation) may also be applied to fill the holes if required.

Referring again to FIG. 2, the depth map generator 124 can compute one or more depth map zMAP from the disparity maps dMAP constructed by the disparity estimator 122. In practice, an analysis of the generated depth maps reveals that certain depth maps zMAP may include erroneous maximal depth values at discrete regions adjacent to the edge boundaries. These erroneous depth values may result in improper stereoscopic rendering. To correct these abnormalities, the filter generator 126 can construct a filter map fMAP to be applied on the depth map zMAP.

Figure 5:
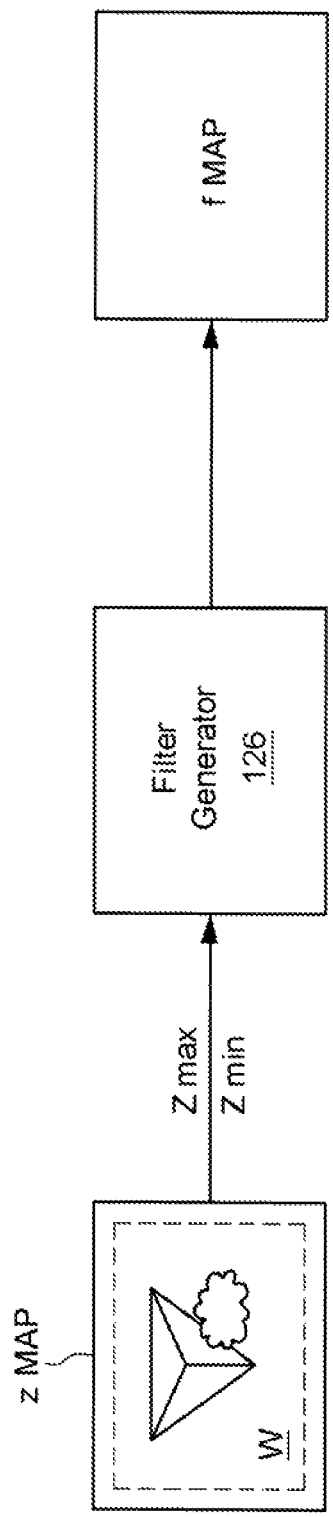
FIG. 5 is a schematic diagram illustrating how a filter map is generated.

FIG. 5 is a schematic diagram illustrating how the filter map fMAP can generated. Assuming that the main subject of interest to show with depth relief is centered on a middle area of the image, a maximal depth value Zmax and a minimal depth value Zmin may be estimated from a window W centered on the middle area of the depth map zMAP. The maximal depth value Zmax and the minimal depth value Zmin then can be used to define a filter function of the filter map fMAP.

In one embodiment, the filter function can be defined as a quadratic function of a "bowl" or parabola shape expressed by the following formulae:

$$F(x) = \alpha x2 + \beta x + \gamma, \quad (2)$$

wherein $\alpha$, $\beta$ and $\gamma$ can be constant parameters.

The constructed filter map fMAP can have a pixel size that is equal to that of the depth map zMAP. Moreover, the depth values defined in the filter map fMAP are preferably in a range between the maximal depth value Zmax and the minimal depth value Zmin. In one embodiment, the parameters $\alpha$ and $\gamma$ can be assigned with the minimal depth value Zmin (i.e., $\alpha = \gamma = $ Zmin), and $\beta$ can be assigned with the maximal depth value Zmax (i.e., $\beta = $ Zmax).

Once it is generated, the filter map fMAP can be combined with the depth map zMAP via the combine module 128 to derive the corrected depth map ZMAP. In one embodiment, the adjusted depth map ZMAP can be computed according to the following formulae:

$$ZMAP = w_1 \times zMAP + w_2 \times fMAP, \quad (3)$$

wherein $w_1$ and $w_2$ are weight coefficients whose sum is equal to 1 (i.e., $w_1 + w_2 = 1$).

The weight coefficients $w_1$ and $w_2$ may be functions of the pixel positions in the depth map, e.g., the weight coefficient $w_1$ may be greater close to the center of the depth map zMAP and smaller close to the boundaries of the depth map zMAP, while the weight coefficient $w_2$ may become smaller close to the center of the depth map zMAP and greater close to the boundaries of the depth map zMAP. In simpler embodiments, the weight coefficients $w_1$ and $w_2$ can also be constant coefficients for reducing computation cost, e.g., $w_1$ can be equal to about 0.3, and $w_2$ can be equal to about 0.7.

Figure 6:
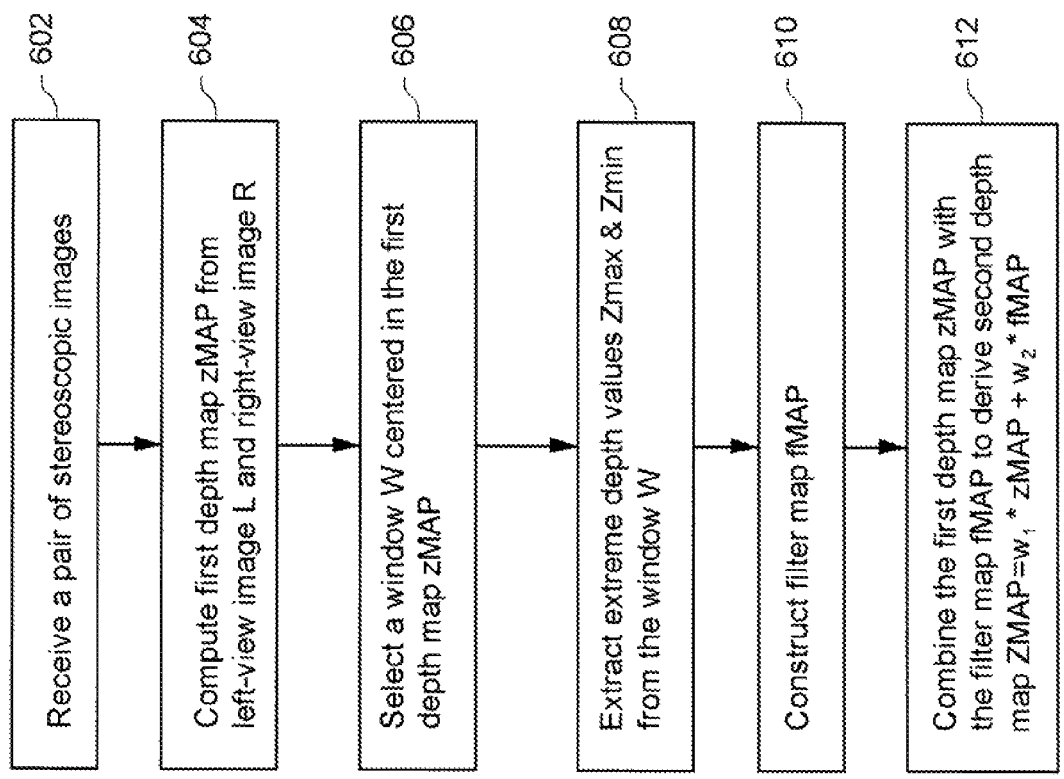
FIG. 6 is a flowchart of method steps for computing a depth map from a pair of stereoscopic images.

FIG. 6 is a flowchart of method steps to compute the depth map ZMAP. In initial step 602, a pair of stereoscopic images can be received at the receiver unit 102. The pair of stereoscopic images can include the left-view image L and the right-view image R respectively representing left-eye and right-eye perspective views. In step 604, the depth map generator 124 can compute the first depth map zMAP from the left-view image L and the right-view image R. As described previously, the first depth map zMAP can be derived from the disparity map dMAP generated by the disparity estimator 122. In particular, the disparity map dMAP can be estimated by applying a bidirectional stereo matching method, and holes occurring in the dMAP due to occlusion can be filled with disparity values associated with adjacent pixel regions, as described previously with reference to FIG. 4.

In step 606, a window W can be selected from the first depth map zMAP. In one embodiment, the window W can be centered on a middle area of the first depth map zMAP. In step 608, extreme depth values including the maximal depth value Zmax and the minimal depth value Zmin can be extracted from the selected window W. In step 610, these extreme depth values can then be transmitted from the depth map generator 124 to the filter generator 126 for constructing the filter map fMAP. As described previously, the filter map fMAP can be defined with a quadratic filter function having a "bowl" or parabola shape. In step 612, the combine module 128 can then apply the filter map fMAP on the depth map zMAP by adding the depth map zMAP applied with the weight coefficient $w_1$ and the filter map fMAP applied with the weight coefficient $w_2$, as defined in formulae (3) described previously. The resulting depth map ZMAP outputted from the combine module 128 can have boundary abnormalities substantially removed.

At least one advantage of the stereoscopic image processing system described herein is the ability to correct abnormal depth data and occlusion holes in the depth map in a cost-effective manner. Accordingly, 3D stereoscopic images can be rendered more smoothly.

It is understood that the elements described in the present application may be implemented in various forms of hardware, software, and combinations thereof. The functions the shown elements may be provided through the use of dedicated hardware as well as hardware capable of executing software. For example, the functions may be executed by a single dedicated processor, by a single shared processor, or by a plurality of individual processors.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A stereoscopic image rendering system comprising:
   a receiver unit adapted to receive a pair of stereoscopic images; and
   an image processing unit adapted to
      compute a first depth map from the pair of stereoscopic images;
      determine extreme depth values from a window selected in the depth map;
      determine a filter map based on the extreme depth values; and
      compute a second depth map by combining the filter map with the first depth map;
      wherein the filter map is defined with a quadratic function expressed by the formulae $\alpha x2 + \beta x + \gamma$, wherein $\alpha$, $\beta$ and $\gamma$ are parameters, the extreme depth values include a minimal depth value and a maximal depth value, the minimal depth value being assigned to the parameters $\alpha$ and $\gamma$, and the maximal depth value being assigned to the parameter $\beta$.

2. The system according to claim 1, wherein the second depth map is computed by adding the first depth map applied with a first weight, with the filter map applied with a second weight.

3. The system according to claim 2, wherein the sum of the first weight with the second weight is equal to 1.

4. The system according to claim 1, wherein the window is centered on a middle area of the first depth map.

5. The system according to claim 1, wherein the image processing unit is further adapted to
   apply a bidirectional stereo matching method to compute the first depth map from the pair of stereoscopic images; and
   derive the first depth map from the disparity map.

6. The system according to claim 5, wherein the image processing unit is configured to fill an occlusion hole in the disparity map with depth values of a pixel region adjacent to the occlusion hole.

7. The system according to claim 5, wherein the image processing unit is configured to fill a boundary hole in the disparity map with depth values of a pixel region adjacent to the boundary hole.

8. A method of processing stereoscopic images, comprising:
- computing a first depth map from a pair of stereoscopic images;
- selecting a window in the first depth map;
- determining extreme depth values in the window;
- based on the extreme depth values, forming a filter map associated with the first depth map, wherein the filter map is defined by a filter function $F(x) = \alpha x2 + \beta x + \gamma$, wherein $\alpha$, $\beta$ and $\gamma$ are parameters, the extreme depth values include a minimal depth value and a maximal depth value, the minimal depth value being assigned to $\alpha$ and $\gamma$, and the maximal depth value being assigned to $\beta$; and
- combining the first depth map with the filter map to derive a second depth map.

9. The method according to claim 8, wherein the window is centered in the first depth map.

10. The method according to claim 8, wherein the step of combining the first depth map with the filter map to derive a second depth map includes:
- applying a first weight to the first depth map;
- applying a second weight to the filter map; and
- adding the weighted first depth map with the weighted filter map.

11. The method according to claim 10, wherein the sum of the first weight with the second weight is equal to 1.

12. The method according to claim 8, wherein the step of computing a first depth map from a pair of stereoscopic images comprises:
- applying a bidirectional stereo matching method to compute a disparity map from the pair of stereoscopic images; and
- deriving the first depth map from the disparity map.

13. The method according to claim 12, wherein the step of applying a bidirectional stereo matching method to compute the disparity map further includes filling an occlusion hole in the disparity map with depth values of a pixel region adjacent to the occlusion hole.

14. The method according to claim 12, wherein the step of applying a bidirectional stereo matching method to compute the disparity map further includes filling a boundary hole in the disparity map with depth values of a pixel region adjacent to the boundary hole.

* * * * *